United States Patent [19]
Kratish et al.

[11] Patent Number: 5,927,675
[45] Date of Patent: Jul. 27, 1999

[54] TOOL FOR HAVING A FRAME

[76] Inventors: Martin L Kratish, 5200 SW. 115th Ave., Cooper City, Fla. 33330; Lawrence Kratish, 8741 Lake Dasha Ter., Plantation, Fla. 33324

[21] Appl. No.: 08/970,598

[22] Filed: Nov. 14, 1997

Related U.S. Application Data

[63] Continuation-in-part of application No. 08/795,251, Feb. 10, 1997.

[51] Int. Cl.⁶ ..................................................... A47G 1/00
[52] U.S. Cl. ......................... 248/466; 248/475.1; 40/713
[58] Field of Search .................................. 248/466, 460, 248/470, 475.1; 40/713, 757

[56] References Cited

U.S. PATENT DOCUMENTS

| | | | |
|---|---|---|---|
| 1,005,499 | 10/1911 | Baker | 248/475.1 |
| 1,908,147 | 5/1933 | Hoegger | 248/466 |
| 2,641,427 | 6/1953 | Krogh . | |
| 2,952,431 | 9/1960 | Pedley . | |
| 4,212,123 | 7/1980 | Robin . | |
| 4,295,625 | 10/1981 | Degger et al. | 248/466 |
| 4,597,554 | 7/1986 | James . | |
| 5,303,895 | 4/1994 | Hart . | |
| 5,314,159 | 5/1994 | Szarata . | |

*Primary Examiner*—Victor N. Sakran
*Attorney, Agent, or Firm*—Herbert L. Lerner; Laurence A. Greenberg

[57] ABSTRACT

A frame hanging tool which includes an elongated body member having a first side, a second side and a length. The frame hanging tool also has at least one level arranged on the elongated body member. The elongated body member has a plurality of fastener guides formed therein for receiving and guiding a plurality of fasteners. The at least one level indicating whether the plurality of fasteners are aligned level with respect to each other.

9 Claims, 4 Drawing Sheets

5,927,675

TOOL FOR HAVING A FRAME

CROSS-REFERENCE TO RELATED APPLICATION

This application is a continuation-in-part of application Ser. No. 08/795,251, filed Feb. 10, 1997.

BACKGROUND OF THE INVENTION

1. Field of the Invention

The invention relates, generally, to a tool which assists in hanging an object on a structure, and more specifically, it relates to determining the placement of fasteners such as nails for the purpose of hanging pictures, frames, carpets, sculptures, etc. on the same horizontal, evenly spaced plane.

2. Description of the Related Art

Various devices are known which assist in hanging pictures and like objects so that the object will hang level. However, there remains a need for an improved method for hanging framed works and similar items that will hang securely in a level position.

U.S. Pat. No. 2,952,431 to Pedley teaches a cross bar which attaches to the back of a frame of an item to be hung on a wall. At the bottom of the frame there is secured an end piece into which the cross bar is held. The cross bar can be maneuvered within the confines of the end piece in such a manner that the frame can be leveled out should the frame be initially off center. As can be seen, the Pedley taught invention requires time, effort and expense to secure the cross piece and the end piece to the frame.

U.S. Pat. No. 5,303,895 to Hart teaches an apparatus which is attached to a frame before the frame is mounted to a surface such as a wall. The Hart taught apparatus has a built in level for assisting in the proper placement of the apparatus on the frame. The apparatus contain areas in which fasteners may be inserted to attach the frame and apparatus to the wall. As can be seen, the Hart taught invention requires time, effort and expense to secure the apparatus to the frame.

SUMMARY OF THE INVENTION

It is accordingly an object of the invention to provide a tool for hanging a frame which overcomes the herein-mentioned disadvantages of the heretofore-known devices and methods of this general type, and which provides a tool that assists in hanging a frame perfectly level on a surface that is easy to use and inexpensive to manufacture.

The invention is a tool that sets the proper placement of fasteners such as nails, screws, pegs, mollies, hooks, bull hooks, etc. for the purpose of hanging objects such as pictures, frames, sculptures, and other items on the fasteners or devices attached to the fasteners. The invention may also be advantageously used to hang multiple objects, evenly spaced, and on the same plane.

With the foregoing and other objects in view there is provided, in accordance with the invention, a frame hanging tool, comprising: an elongated body member having a first side, a second side and a length; at least one level disposed on the elongated body member; and the elongated body member has a plurality of fastener guides formed therein for receiving and guiding a plurality of fasteners, the at least one level indicating whether the plurality of fasteners are aligned level with respect to each other.

In accordance with an added feature of the invention, the fastener guides are formed of slots and fastener removal holes.

In accordance with another feature of the invention, there is a ruler disposed on the elongated body member.

In accordance with an additional feature of the invention, the elongated body member is formed of a material selected from the group consisting of wood, plastic, metal and composite material.

In accordance with yet an added feature of the invention, the at least one level is one of two levels.

In accordance with yet another feature of the invention, the length of the elongated body member is 36 inches.

In accordance with yet another additional feature of the invention, the fastener removal holes are in the form of a shaped selected from the group consisting of circular shapes, square shapes, rectangular shapes, triangular shapes and hexagonal shapes.

In accordance with an added feature of the invention, there is a selectively removable cartridge member engaging the elongated body member and the plurality of fastener guides are disposed on the cartridge member.

In accordance with yet a further feature of the invention, the cartridge member is a plurality of cartridge members.

In accordance with a concomitant feature of the invention, there are tabs which have the fastener removal holes formed therein and the tabs are removably secured to the elongated body member.

Other characteristic features of the invention are set forth in the appended claims.

Although the invention is illustrated and described herein as embodied in a tool for hanging a frame, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

DESCRIPTION OF THE PREFERRED EMBODIMENTS

Figure 1:
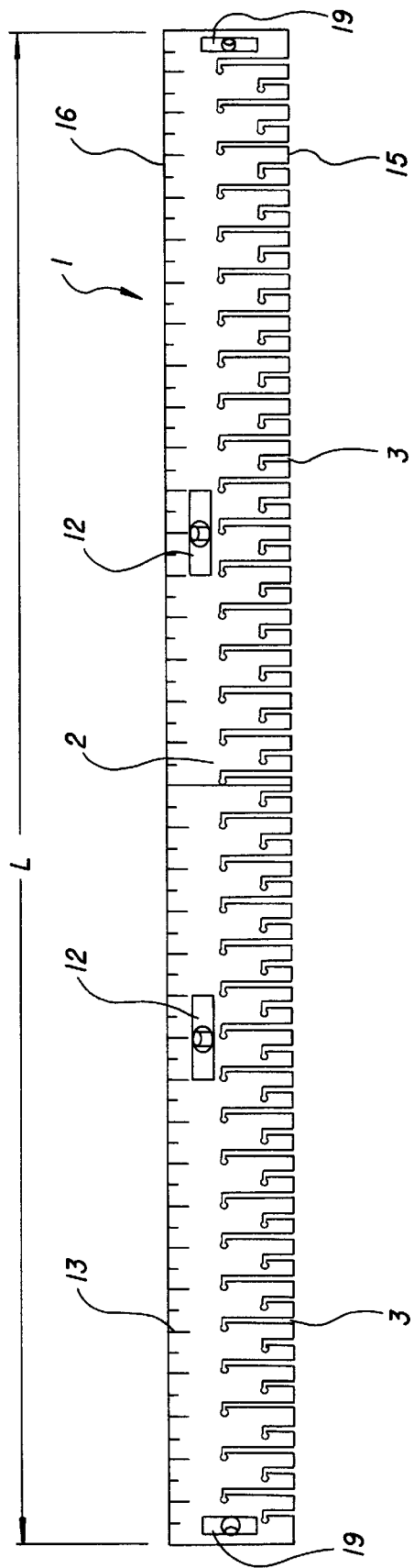
FIG. 1 is a diagrammatic, side-elevational view of a frame hanging tool in accordance with the invention.

Referring now to the figures of the drawings in detail and first, particularly, to FIG. 1 thereof, there is shown a frame hanging tool 1. The frame hanging tool 1 has an elongated body member 2 having a rectangular shape. The body member 2 has a first side 15, a second side 16 and a length L. The body member 2 is ideally made out of a light weight, pliable material which can traverse irregular surfaces. The body member 2 can be made out of various materials including plastic, metal, wood and composite materials. Although, the frame hanging tool 1 is preferably in a rectangular shape, other shapes such as squares, triangles, circles, irregular rectangles, etc. are possible.

Figure 2:
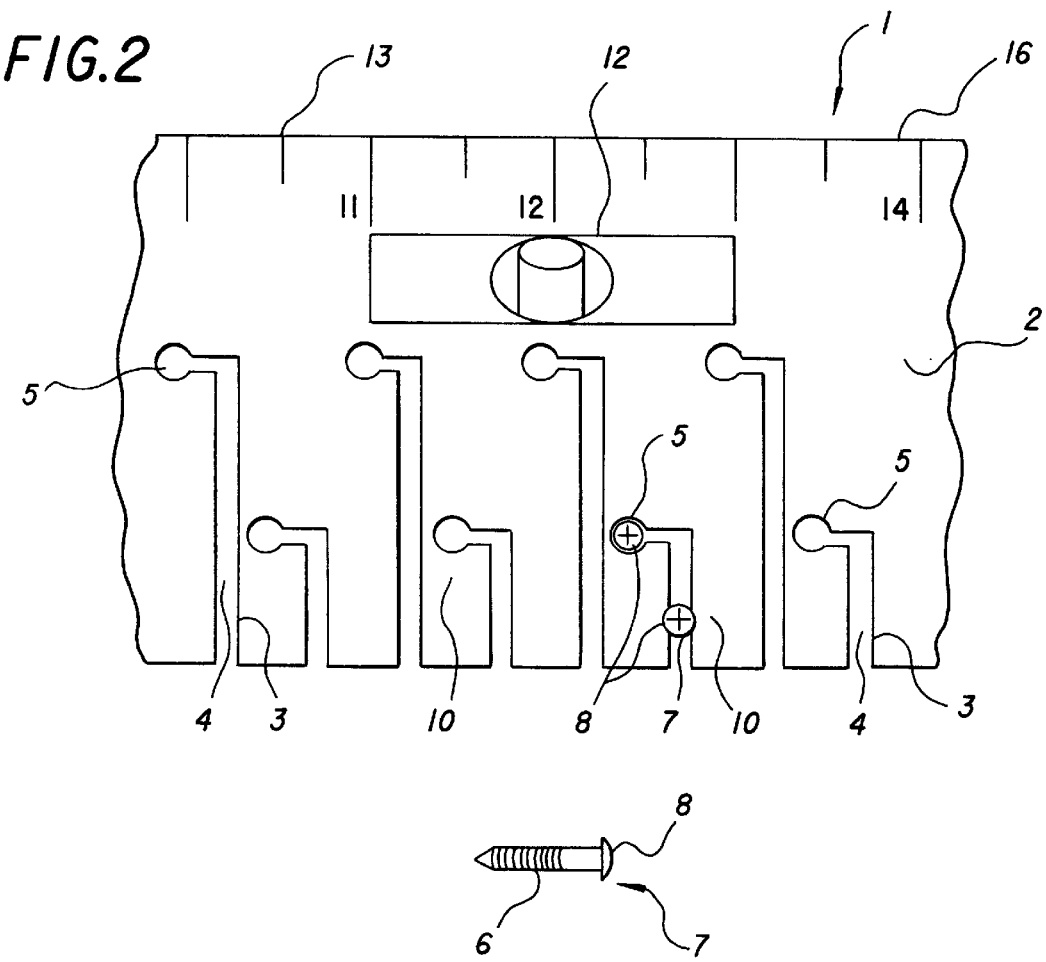
FIG. 2 is an enlarged, fragmentary, side-elevational view of a middle portion of the frame hanging tool.

A plurality of short and long L-shaped fastener guides 3 are equally spaced along the body member 2. FIG. 2 shows that the L-shaped fastener guides 3 have a fastener receiving slot 4 and a fastener removal hole 5. A body member 6 of a fastener 7 such as a nail, screw, peg or mollie is slid into the fastener receiving slot 4. A head 8 of the fastener 7 can lie above the surface 10 of the body member 2 of the frame hanging tool 1. The head 8 of the fastener 7 is slipped though the larger removal hole 5 when it is time to remove the frame hanging tool 1. Should the head 8 of the fastener 7 be larger than the removal hole 5, the frame hanging tool 1 can be removed by maneuvering the frame hanging tool 1 around the body member 6 of the fastener 7 along the path provided by the slot 4.

A plurality of levels 12 are disposed along the length L of the body member 2 of the frame hanging tool 1. The levels 12 tell the user if two or more fasteners 7 are on the same level plane so that a frame hung on the fasteners 7 will also lie level.

Figure 3:
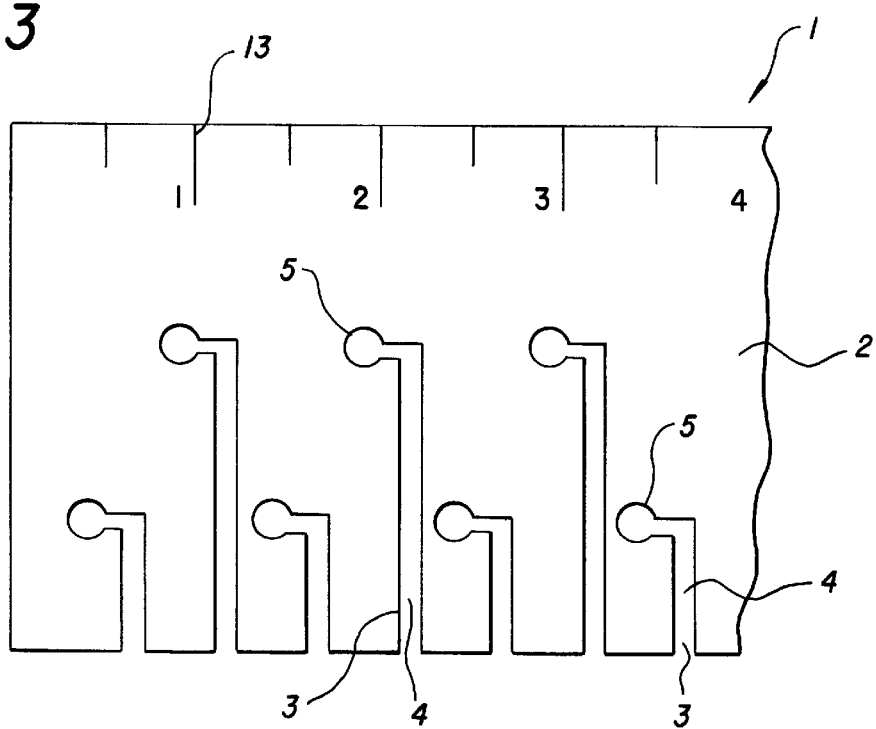
FIG. 3 is an enlarged, fragmentary, side-elevational view of an end of the frame hanging tool.

Measuring units 13 are embedded into second side 16 of the body member 2 to assist in measuring the length between two fasteners 7. As shown in FIG. 3, the measuring units 13 start at one end of the body member 2. The measuring units 13 form a ruler which runs the length L of the body member 2. The frame hanging tool 1 can be of any length, however, the preferred length is 36 inches.

The frame hanging tool 1 is easy to use. First, one determines a height at which to set a frame. One end of the frame hanging tool 1 is set over the area which is to receive the first fastener 7. The fastener 7 is slid along a first L-shaped fastener guide 3 and rests in the area of the removal hole 5. The fastener 7 is then affixed to a self sustaining depth in a surface such as a wall. The horizontal displacement from the first L-shaped fastener guide 3 to a second L-shaped fastener guide 3 is determined by the built in ruler 13. A second fastener 7 is then slid along the second L-shaped fastener guide until it also resides in a second removal hole 5. The frame hanging tool 1 is then rotated about the fastener 7 located in the first L-shaped fastener guide 3 until the levels indicate a true or level position. Once the level condition is determined, the fastener 7 in the second L-shaped fastener guide 3 is inserted into a self adhering depth in the wall. The frame hanging tool 1 is then aligned such that the heads 8 of the fasteners 7 are aligned with the holes 5 of the L-shaped fastener guides 3 and the frame hanging tool 1 is then removed. The two fasteners 7 are then set to a final depth and the frame is placed on the fasteners 7.

It is noted that a third, fourth, or fifth . . . fastener 7 can be aligned from the last fastener(s). In addition, it is noted that the frame hanging tool 1 can be placed on a pre-existing fastener 7 already set in the wall.

Figure 4:
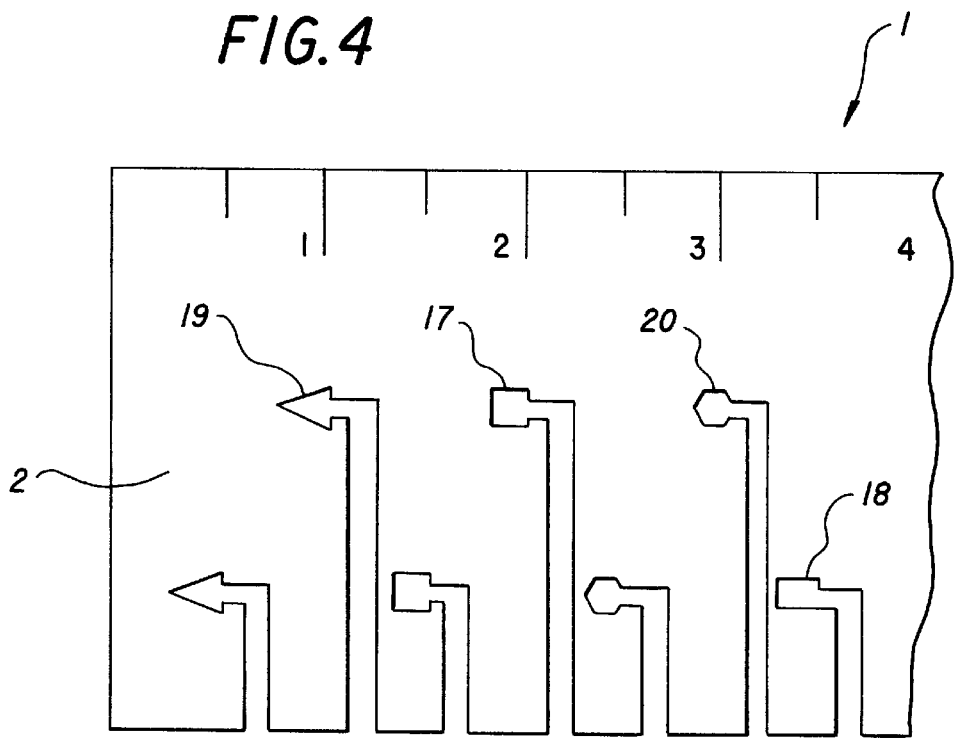
FIG. 4 is an enlarged, fragmentary, side-elevational view of the end of the frame hanging tool having various embodiments of a fastener guide.

FIG. 3 shows the removal holes 5 to be in the shape of a circle. FIG. 4 shows alternative shapes for the removal holes 5 including square 17, rectangular 18, triangular 19 and hexagonal 20 shaped removal holes 5. Other shapes are also possible. The body member 2 of the frame hanging tool 1 can be formed with all or any combination of the above mentioned shapes to form the removal holes 5.

Figure 5A:
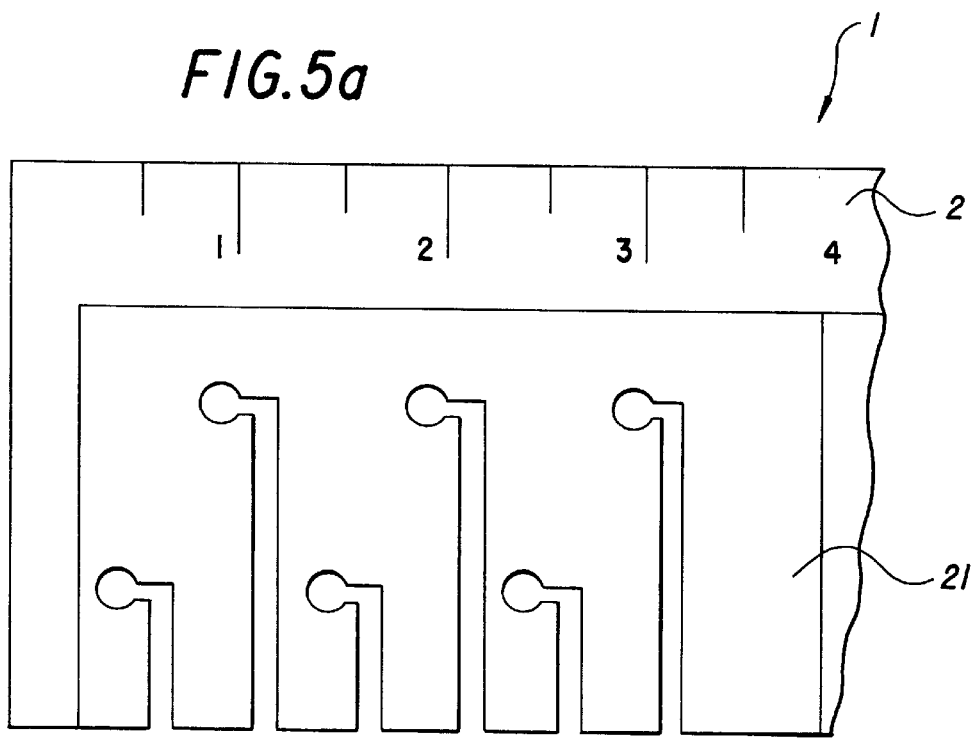
FIGS. 5a and 5b are enlarged, fragmentary, side-elevational view of the end of a second embodiment of the frame hanging tool.
Figure 5B:
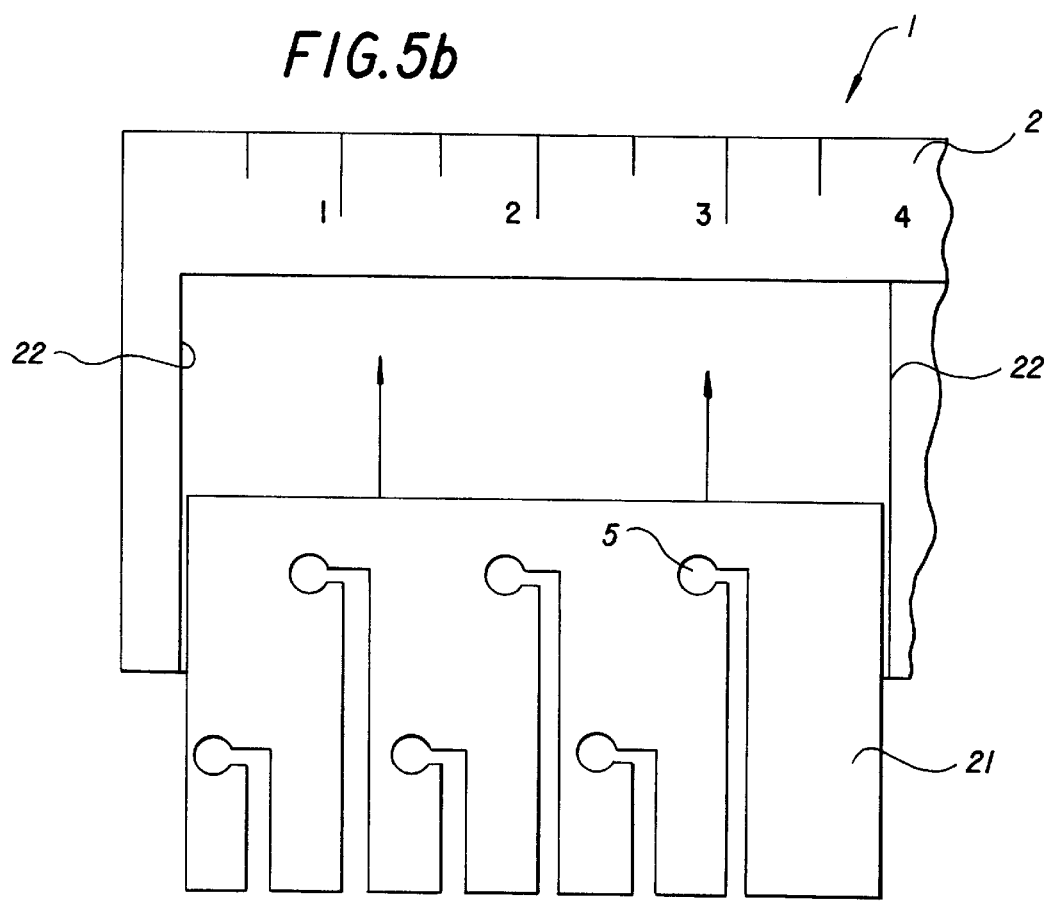

FIGS. 5a and 5b show a second embodiment of the invention. The body member 2 has a slide out cartridge 21 which can be inserted and removed from the body member 2. The cartridge 21 is shown with circular removal holes 5. The cartridge 21 could be replaced with a second cartridge in which the holes 5 are of a different shape such as those shown in FIG. 4. The cartridge 21 slides into and is secured in grooves 22 of the body member 2. The body member 2 and the cartridge 21 can be configured (sized) such that the body member 2 receives one long cartridge 21 or a plurality of smaller cartridges 21.

Figure 6:
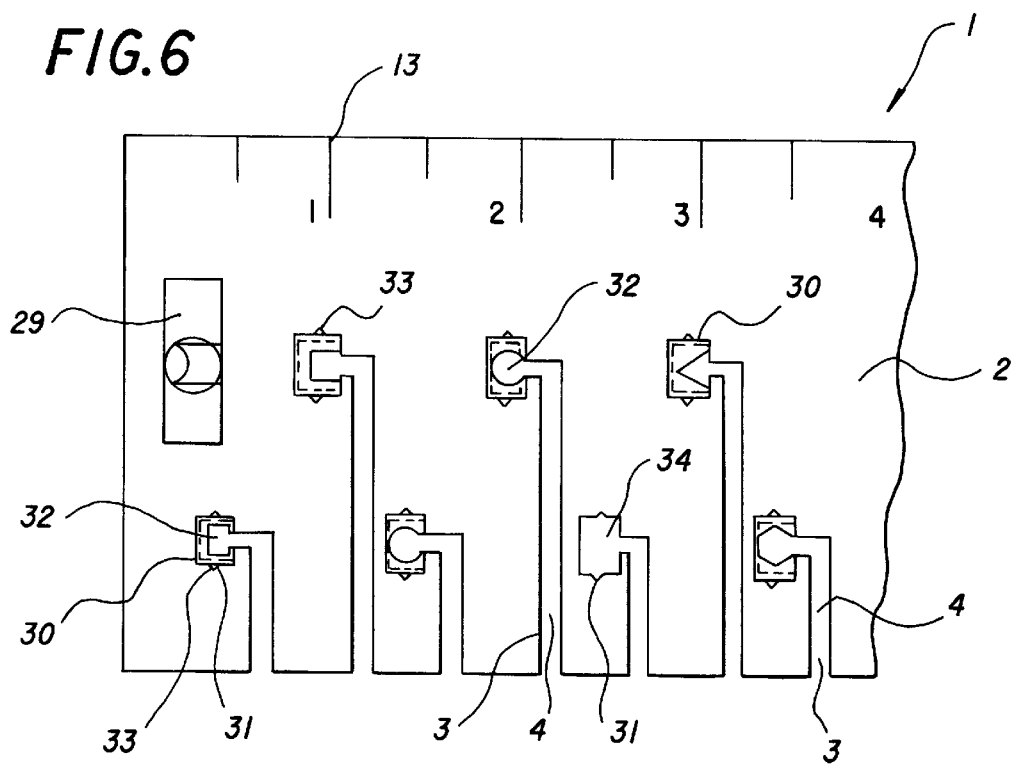
FIG. 6 is an enlarged, fragmentary, side-elevational view of a set of tabs forming fastener removal holes of the frame hanging tool.

FIG. 6 shows a third embodiment of the frame hanging tool 1. In addition to the horizontally mounted levels 12, there can be vertically mounted levels 29 disposed at each end of the frame hanging tool 1. The vertically mounted levels 29 allow the frame hanging tool 1 to be used in the vertical position. It is also envisioned that levels could be placed at any angle on the body member 2.

The frame hanging tool 1 may also have a plurality of individually removable tabs 30 which can be snapped into the body member 2. The body member 2 has a plurality of cavities 34 with female snap buttons 31 and the tab 30 has a plurality of male snap buttons 33 for engaging the female snap buttons 31 for securing the tabs 20 to the body member 2. The tabs 20 are each formed with a cavity 32. The cavity 32 comes in various sizes and shapes including circles, squares, rectangles, triangles, hexagons, etc. In this manner, the frame hanging tool 1 can be adapted to handle any kind of fastener including but not limited to nails, screws, mollies, hooks, bull hooks, pegs, etc.. The frame hanging tool 1 may be formed with one tab 30 or with a plurality of tabs 30.

We claim:

1. A frame hanging tool, comprising:

an elongated body member having a first side, a second side and a length;

at least one level disposed on said elongated body member; and said elongated body member having a plurality of fastener guides formed therein for receiving and guiding a plurality of fasteners, said at least one level indicating whether the plurality of fasteners are aligned level with respect to each other.

2. The frame hanging tool according to claim 1, including a ruler disposed on said elongated body member.

3. The frame hanging tool according to claim 1, wherein said elongated body member is formed of a material selected from the group consisting of wood, plastic, metal and composite material.

4. The frame hanging tool according to claim 1, wherein said at least one level is one of two levels.

5. The frame hanging tool according to claim 1, wherein said length of said elongated body member is 36 inches.

6. The frame hanging tool according to claim 1, wherein said fastener removal holes are in the form of a shaped selected from the group consisting of circular shapes, square shapes, rectangular shapes, triangular shapes and hexagonal shapes.

7. The frame hanging tool according to claim 1, including a selectively removable cartridge member engaging said elongated body member and said plurality of fastener guides are disposed on said cartridge member.

8. The frame hanging tool according to claim 7, wherein said cartridge member is a plurality of cartridge members.

9. The frame hanging tool according to claim 2, including tabs having said fastener removal holes formed therein and said tabs are removably secured to said elongated body member.

* * * * *

UNITED STATES PATENT AND TRADEMARK OFFICE
CERTIFICATE OF CORRECTION

PATENT NO. : 5,927,675
DATED : July 27, 1999
INVENTOR(S) : Martin Kratish et al.

It is certified that error appears in the above-identified patent and that said Letters Patent is hereby corrected as shown below:

Title page, Item [54] and col. 1, should read as follows:
TOOL FOR HANGING A FRAME Signed and Sealed this Nineteenth Day of September, 2000

Attest:

Q. TODD DICKINSON

*Attesting Officer*     *Director of Patents and Trademarks*